Nov. 5, 1968  O. WALTZ ET AL  3,408,817
LIQUID ROCKET ENGINE AND FUEL SYSTEM THEREFOR
Filed Oct. 19, 1966
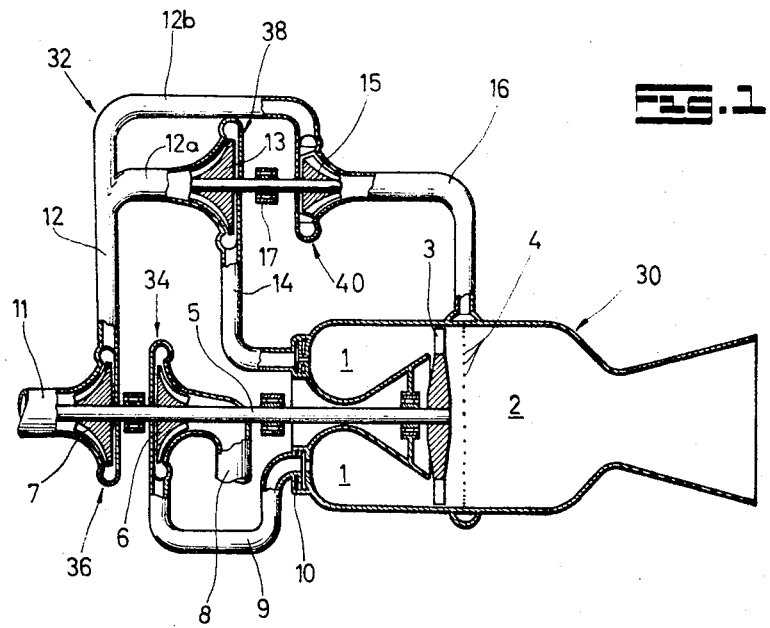
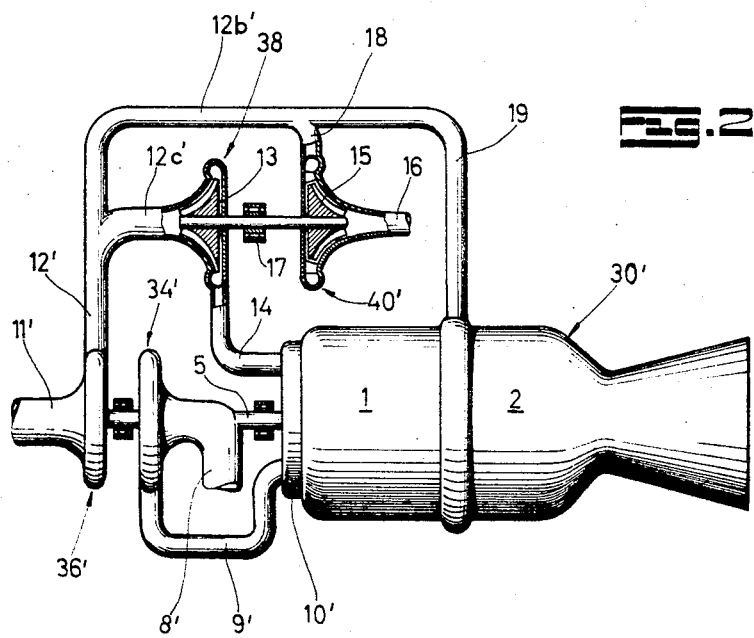
INVENTORS
Otto Waltz
Rudi Nehrkorn
By McGlew and Toren
ATTORNEYS United States Patent Office 3,408,817
Patented Nov. 5, 1968

3,408,817
LIQUID ROCKET ENGINE AND FUEL SYSTEM THEREFOR
Otto Waltz, Neukirchstockach, and Rudi Nehrkorn, Putzbrunn, Germany, assignors to Bolkow Gesellschaft mit beschrankter Haftung, Ottobrunn, near Munich, Germany
Filed Oct. 19, 1966, Ser. No. 587,708
Claims priority, application Germany, Oct. 21, 1965, B 84,192
7 Claims. (Cl. 60—246)

ABSTRACT OF THE DISCLOSURE

A rocket engine which is operated by liquid fuel or a liquid propellant includes at least one precombustion chamber which is arranged to discharge combustion gases through turbine blades and into a main combustion chamber. The turbine blades are carried by an auxiliary turbine which is arranged at the head of the main combustion chamber and centrally of a plurality of the precombustion chambers and rotates a shaft to drive two separate fuel component pumps. At least one of the pumps includes two separate branches. A high pressure pump is connected to take suction from one of the branches and to discharge the fuel to the precombustion chamber. The second branch is connected directly to the main combustion chamber. The complete arrangement includes a fluid motor which is driven by the flow of fuel in the second branch and is connected to the high pressure pump to drive the high pressure pump.

Summary of the invention

This invention relates, in general, to the construction of rocket engines and the fuel system therefor and, in particular, to a new and useful liquid rocket engine having a precombustion chamber in which fuel is ignited and expanded by flowing through a turbine to a main combustion chamber, and wherein the turbine is arranged to drive at least one pump having a discharge which branches into two lines with the first branch leading to the suction of a high pressure pump arranged to discharge the fuel into a precombustion chamber and with the other branch connected either directly to the main combustion chamber or through a prime mover which drives the high pressure pump.

For the satisfactory operation of liquid rocket engines, it may be necessary to recompress a portion of a fuel component especially when this portion passes through a cooling system, for example, before being fed to the main combustion chamber or when it drives a turbine or when it is injected into a precombustion chamber of a pressure higher than the main combustion chamber. It is known to combine a precompressing pump with additional pumps in a single rotor wheel. In such a construction, the low pressure portion of the fuel delivery is tapped by the impeller at approximately half the radial distance from the pump shaft and it is conveyed into the combustion chamber and the remaining portion is moved to the outlet cross section of the pump where it reaches its final pressure. With such a construction, the pump is very compact, but there is a disadvantage in respect to the flow characteristic of the pump which adversely affects its efficiency. A further disadvantage is that the two partial flow streams which are tapped from such a pump cannot be separately regulated.

It is also known to arrange two separate impellers of a precompressing pump and an additional high pressure pump on a single shaft. As the high pressure pump is normally a smaller unit in comparison with the preliminary pump, as is the case, for example, with engines having a preliminary and main combustion chambers and a turbine located between these chambers, its arrangement at the shaft end would actually be desirable because the shaft can be reduced to a small diameter at such locations. On the other hand, the shaft end is advantageously used to provide an entrance cone for the main pump to produce favorable inflow conditions for the pump which is subject to critical cavitations and thus provide for optimum operating conditions of this pump. Thus, at any other point between the main pump or pumps or between one main pump and the turbine, there results the structurally unfavorable situation of having to place a small pump on a shaft of relatively great diameter. A further disadvantage results in the fact that the structural length of the unit as a whole is increased and due to the arrangement on one shaft the speed of rotation of the high pressure pump is a priori fixed to the speed of the preliminary pump.

A transmission gear for the selection of torque and speed required for the drive of the high pressure pump will give a certain freedom in the selection of the speed of rotation and design of the shaft but it also entails an increase in the structural length and introduces other problems of construction and lubrication.

In accordance with the present invention there is provided a liquid rocket engine which includes a preliminary combustion chamber which is separated from a main combustion chamber by a turbine so that the gases generated in the precombustion chamber will expand through the turbine to the lower pressure of the main combustion chamber. The turbine is advantageously employed to drive a pump for supplying a fuel component both to the preliminary combustion chamber and the main combustion chamber. In accordance with a feature of the invention, the pump is arranged to discharge into at least two branch lines one of which is directed through a high pressure pump which supplies the fuel at a higher pressure to the preliminary combustion chamber and the other branch line is either connected directly to the main combustion chamber or to a turbine which is connected to operate the high pressure pump. In the case where the turbine is employed to operate the high pressure pump, the pump which is operated by the turbine of the rocket engine must supply a pressure which is above the main combustion engine pressure by an amount equivalent to the drop in pressure over the turbine which is arranged to drive the high pressure pump.

Accordingly, it is an object of the invention to provide a fuel supply system for a liquid rocket engine having a precombustion and main combustion chamber separated by a turbine which permits the expansion of the pressure gases in the preliminary chamber as they are passed to the main combustion chamber and wherein there is at least one fuel pump which is driven by the turbine and which includes a discharge line connected to at least two branches, one branch being directed to a high pressure pump for delivery by the high pressure pump to the precombustion chamber and the other branch being connected either directly to the main combustion chamber or through a turbine for driving the high pressure pump.

A further object of the invention is to provide a fuel supply system for a liquid fuel rocket engine which includes a pump which is arranged to discharge through two branch lines, with a first branch being conducted through a high pressure pump for re-compressing the fuel for delivery to a precombustion chamber of the rocket engine and with a second branch being connected either directly to the main combustion chamber or through a turbine for driving the high pressure pump.

A further object of the invention is to provide a liquid fuel rocket and a fuel system therefor which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a longitudinal sectional view of a liquid fuel rocket engine and associated fuel system constructed in accordance with the invention; and FIG. 2 is a view similar to FIG. 1 of another embodiment of the invention.

Referring to the drawings in particular, the invention embodied therein in FIG. 1 comprises a liquid fuel rocket generally designated 30 having an associated fuel component supply system generally designated 32. The rocket engine 30 is of a type which will operate with a liquid fuel consisting of two components. The combustion chamber of the rocket engine 30 is divided into a preliminary combustion chamber 1 and a main combustion chamber 2. In the preliminary combustion chamber a first fuel component burns with a portion of a second fuel component at a temperature compatible with the turbine material. The gases burned in the precombustion chamber flow through the turbine 3 giving off some of their energy and then into the main combustion chamber 2 where the remaining portion of the second fuel component required for optimum combustion is added through the injection system 4. The pressure difference prevailing between the preliminary combustion chamber 1 and the main combustion chamber 2 is equal to the pressure drop across the turbine 3.

In accordance with a feature of the invention, the turbine 3 is provided with a shaft 5 which extends outwardly from the rocket engine 30 and carries rotors 6 and 7 of pumps 34 and 36, respectively. The pump 34 takes suction through a suction line 8 connected to a liquid fuel tank (not shown) and it discharges fuel (for example, an oxidator) at a higher pressure through a discharge line 9 and an injection head 10 directly into the precombustion chamber 1.

The pump 36 takes suction through a suction line 11 which is connected to a tank (not shown) having a second fuel component and it compresses the fuel to a pressure which is above the main combustion chamber pressure by a certain amount depending on the course of the fuel after it is discharged through a discharge line 12.

A feature of the construction is that the pressure line 12 is provided with at least two branches 12a and 12b. The branch 12a opens into a suction aperture of a high pressure pump 38 having a rotor 13 which is arranged to discharge fuel at a high pressure through the line 14 directly into the precombustion chamber 1.

The other branch line 12b is directed to a turbine 40 having a rotor 15 where it is expanded to the pressure required for injection into the main combustion chamber 2. The turbine 40 is provided with a shaft 17 affixed to the rotor 15 which carries the rotor 13 for the pump 38. The pressure in the line 12 at the discharge at the pump 36 therefore must be sufficient to provide for a pressure drop through the turbine 30 and to be still great enough to permit it to be injected into the main combustion chamber 2. Regulating and control means for the high pressure pump (not shown) can be employed to provide for the desired pressure control to the line 14 and the operation of the pump 36 to supply the sufficient pressure at the discharge for satisfactorily operating the turbine 40 and for satisfactory delivery to the main combustion chamber 2.

In the embodiment indicated in FIG. 2, there is provided a rocket engine generally designated 30' having separate fuel component pumps 34' and 36' which are driven from the turbine in the rocket engine as in the other embodiment. In this embodiment, the fuel which is delivered from the pump 36' through the branch 12b' is directed partially through a line 18 to the pump 40' and partially through a line 19 directly into the main combustion chamber. In this embodiment, the fuel which is directed to the turbine 40' is discharged through a return conduit 16 back to its associated tank (not shown). The fuel component required for complete combustion in the main combustion chamber flows to the injection system similar to the injection system 4 of FIG. 1, through the line 19.

In the embodiment of FIG. 2, the preliminary pump 36' therefore must deliver a greater quantity of fuel than in the embodiment of FIG. 1. In this arrangement, however, the fuel need only be compressed to the injection pressure of the main combustion chamber since the fuel required for operating the turbine 40' will be returned to the tank through the line 16. In this embodiment, a separate speed regulation of the turbine 40' may be carried out without affecting the fuel portion flowing into the main combustion chamber through the line 19.

While specific embodiments of the invention have been shown and described in detail to illustrate the application of the inventive principles, it will be understood that the invention may be embodied otherwise without departing from such principles.

What is claimed is:

1. A liquid fuelled rocket engine comprising, means defining a preliminary and main combustion chamber, a turbine operable by the expansion of gases from the preliminary combustion chamber to the main combustion chamber located between said preliminary and said main combustion chambers, at least one fuel pump for said rocket engine having a discharge with first and second branches, a high pressure pump connected to take suction from said first branch and discharge fuel to said preliminary combustion chamber, said second branch being connected to said main combustion chamber, and a prime mover driven by the flow of fuel in said second branch and connected to said high pressure pump to drive said high pressure pump.

2. A liquid fuelled rocket engine, acording to claim 1, wherein said prime mover is connected to receive the total fuel flowing through said second branch.

3. A liquid fuelled rocket engine, according to claim 1, wherein only a portion of the fuel of said second branch flows to said prime mover and the remaining portion is conducted directly to said main combustion chamber.

4. A liquid fuelled rocket engine, according to claim 1, wherein said fuel pump is connected to said turbine and driven by said turbine.

5. A liquid fuelled rocket engine, according to claim 1, including at least one additional fuel pump, said additional fuel pump and said fuel pump being connected to said turbine and driven by said turbine.

6. A liquid fuelled rocket engine, according to claim 5, wherein said additional fuel pump has a discharge connected directly to said preliminary combustion chamber.

7. A fuel component supply system for a liquid fuel rocket engine comprising a first fuel pump having a discharge with first and second branches, a high pressure pump connected to take suction from said first branch, and a prime mover driven by the flow of fuel in said second branch and connected to said high pressure pump to drive said high pressure pump, said second branch including a portion connected directly to said prime mover and a bypass portion connected to a main combustion chamber of said rocket engine.

References Cited

UNITED STATES PATENTS

| | | | |
|---|---|---|---|
| 1,509,351 | 9/1924 | Graemiger | 230—116 |
| 3,286,473 | 11/1966 | Cowell | 60—258 |

FOREIGN PATENTS 535,101  12/1958  Belgium.

MARTIN P. SCHWADRON, *Primary Examiner.*

DOUGLAS HART, *Assistant Examiner.*